(12) United States Patent
Hashiura et al.

(10) Patent No.: US 9,430,129 B2
(45) Date of Patent: Aug. 30, 2016

(54) CONTROL APPARATUS, METHOD FOR CONTROLLING CONTROL APPARATUS, SERVER, CONTROLLED APPARATUS, CONTROL SYSTEM, AND STORAGE MEDIUM STORING CONTROL PROGRAM

(71) Applicant: SHARP KABUSHIKI KAISHA, Osaka-shi, Osaka (JP)

(72) Inventors: Masaki Hashiura, Osaka (JP); Takayuki Nagamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 176 days.

(21) Appl. No.: 14/025,443

(22) Filed: Sep. 12, 2013

(65) Prior Publication Data

US 2014/0096030 A1   Apr. 3, 2014

(30) Foreign Application Priority Data

Oct. 1, 2012   (JP) ................................. 2012-219848

(51) Int. Cl.
| | |
|---|---|
| G06F 3/00 | (2006.01) |
| G06F 3/0484 | (2013.01) |
| G08C 17/00 | (2006.01) |
| H04L 12/64 | (2006.01) |

(52) U.S. Cl.
CPC ........... G06F 3/04842 (2013.01); G08C 17/00 (2013.01); H04L 12/6418 (2013.01); G08C 2201/42 (2013.01); G08C 2201/93 (2013.01)

(58) Field of Classification Search
CPC .................................................... G06F 3/0481
See application file for complete search history.

(56) References Cited

U.S. PATENT DOCUMENTS

| | | | |
|---|---|---|---|
| 6,182,094 B1 | 1/2001 | Humpleman et al. | |
| 6,198,479 B1 | 3/2001 | Humpleman et al. | |
| 6,243,707 B1 | 6/2001 | Humpleman et al. | |
| 6,288,716 B1 | 9/2001 | Humpleman et al. | |
| 2001/0009424 A1* | 7/2001 | Sekiguchi | 345/740 |
| 2001/0011284 A1 | 8/2001 | Humpleman et al. | |
| 2010/0077021 A1* | 3/2010 | Hsueh et al. | 709/203 |
| 2010/0118115 A1 | 5/2010 | Takahashi et al. | |
| 2011/0157008 A1 | 6/2011 | Maruyama | |
| 2012/0041925 A1* | 2/2012 | Pope et al. | 707/626 |
| 2012/0079387 A1* | 3/2012 | Agnihotri et al. | 715/733 |
| 2012/0272148 A1* | 10/2012 | Strober | 715/716 |

FOREIGN PATENT DOCUMENTS

| | | |
|---|---|---|
| CN | 101494646 A | 7/2009 |
| CN | 102111439 A | 6/2011 |
| JP | 2009-118448 A | 5/2009 |

* cited by examiner

*Primary Examiner* — Anil N Kumar
(74) *Attorney, Agent, or Firm* — Birch, Stewart, Kolasch & Birch, LLP

(57) ABSTRACT

A smartphone includes: an image display section for displaying images in such a manner as to be selectable by a user, each of the images being associated with (i) specifying information for specifying a cleaning robot and (ii) instruction information for instructing the cleaning robot to execute a predetermined process; and a process instruction section for transmitting, in a case where the user selects at least one of the images thus displayed, image information (2) indicative of said at least one of the images to a server, so as to cause the cleaning robot specified by specifying information associated with said at least one of the images to execute a predetermined process that is instructed by instruction information associated with said at least one of the images.

7 Claims, 10 Drawing Sheets

CONTROL APPARATUS, METHOD FOR CONTROLLING CONTROL APPARATUS, SERVER, CONTROLLED APPARATUS, CONTROL SYSTEM, AND STORAGE MEDIUM STORING CONTROL PROGRAM

This Nonprovisional application claims priority under 35 U.S.C. §119 on Patent Application No. 2012-219848 filed in Japan on Oct. 1, 2012, the entire contents of which are hereby incorporated by reference.

TECHNICAL FIELD

The present invention relates to apparatuses such as a control apparatus for controlling a controlled apparatus via a server.

BACKGROUND ART

For years, researches have been conducted on techniques related to a method of operating an external apparatus via a predetermined interface. Particularly, since the operation of the external apparatus has been made complicated along with advancement of processes executable by the external apparatus, many attempts have been carried out in recent years in order to improve the interface.

For example, such an interface has been developed via which a process can be specified by a simple illustration (image). Patent Literature 1 discloses an image data receiving device for receiving, from the outside, an image data set storing therein information (process specifying information) for specifying a process which should be carried out by the image data receiving device itself. With this, the image data receiving device can be operated freely even by an operation device only having an image data transmission function.

CITATION LIST

Patent Literatures

[Patent Literature 1]
Japanese Patent Application Publication, Tokukai, No. 2009-118448 A (Publication Date: May 28, 2009)

SUMMARY OF INVENTION

Technical Problem

According to the technique disclosed by Patent Literature 1, the image data set includes only the "process specifying information". Therefore, a user must specify the external device which is to be operated. Namely, the user is forced to carry out an explicit operation of specifying an apparatus which is to be operated and transmitting an instruction to the apparatus thus specified (for example, an operation of pointing an infrared ray-transmitting part of a remote controller at a television).

However, the interface that forces the user to carry out such the explicit operation is not user-friendly. What is truly required by the user is a "function" that is provided by the external apparatus. In some cases, the apparatus that plays a main role in order to provide the "function" may be arbitrary one.

The present invention was made in view of the above problem, and has an object to provide a control apparatus and the like each enabling a user to operate an external apparatus which is to be operated even if the user does not carry out an explicit operation of specifying the external apparatus, for the purpose of improving user's convenience.

Solution to Problem

In order to solve the foregoing problem, a control apparatus according to one embodiment of the present invention is a control apparatus for controlling a controlled apparatus via a server, including: first display means for displaying images in such a manner as to be selectable by a user, each of the images being associated with (i) a piece of specifying information for specifying a controlled apparatus and (ii) a piece of instruction information for instructing the controlled apparatus to execute a predetermined process; and instruction means for transmitting, in a case where the user selects at least one of the images displayed by the first display means, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images.

In order to solve the foregoing problem, a method for controlling a control apparatus according to one embodiment of the present invention is a method for controlling a control apparatus that controls a controlled apparatus via a server, including: a first displaying step of displaying images in such a manner as to be selectable by a user, each of the images being associated with (i) a piece of specifying information for specifying a controlled apparatus and (ii) a piece of instruction information for instructing the controlled apparatus to execute a predetermined process; and an instruction step of transmitting, in a case where the user selects at least one of the images displayed in the first displaying step, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images.

Advantageous Effects of Invention

According to the one embodiment of the present invention, the control apparatus and the method for controlling the control apparatus each enable a user to control a controlled apparatus which is to be controlled even if the user does not carry out an explicit operation of specifying the controlled apparatus. With this, the control apparatus or the like provides improved user's convenience.

Figure 3:
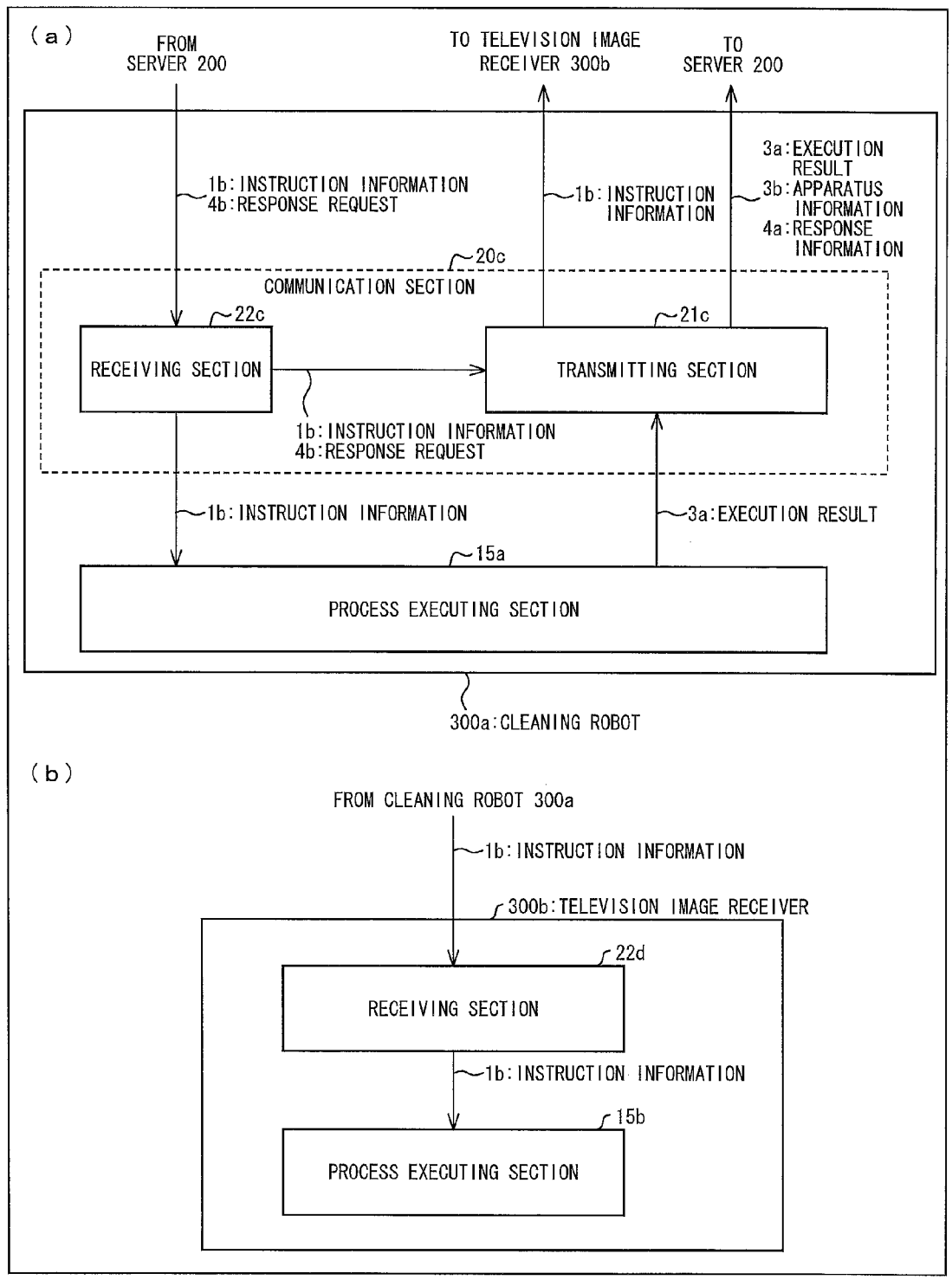

(a) of FIG. 3 is a block diagram illustrating a main part of a configuration of a cleaning robot according to one embodiment of the present invention.

(b) of FIG. 3 is a block diagram illustrating a main part of a configuration of a television image receiver according to one embodiment of the present invention.

Figure 4:
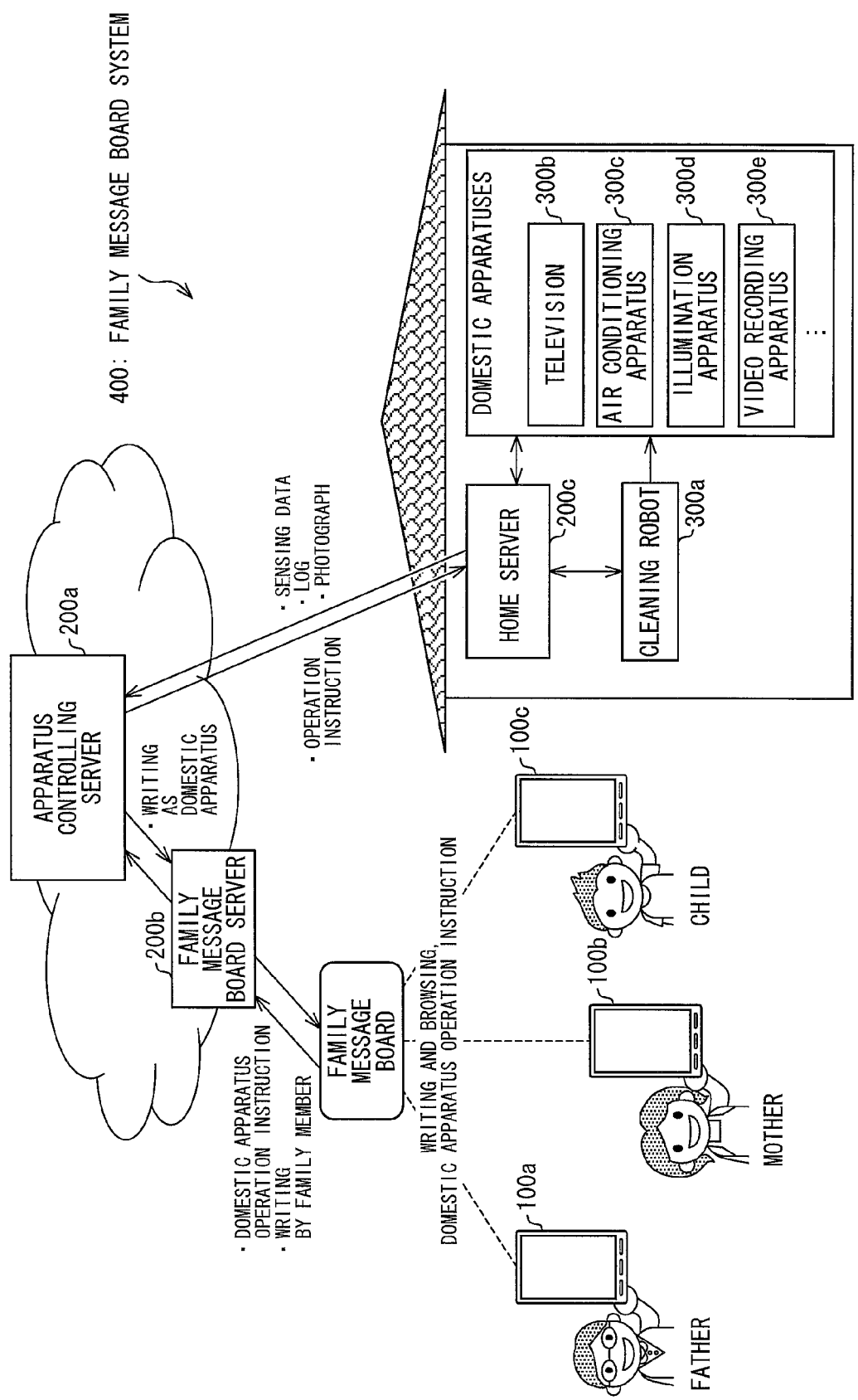

FIG. 4 shows an outline of a family message board system according to one embodiment of the present invention.

Figure 5:
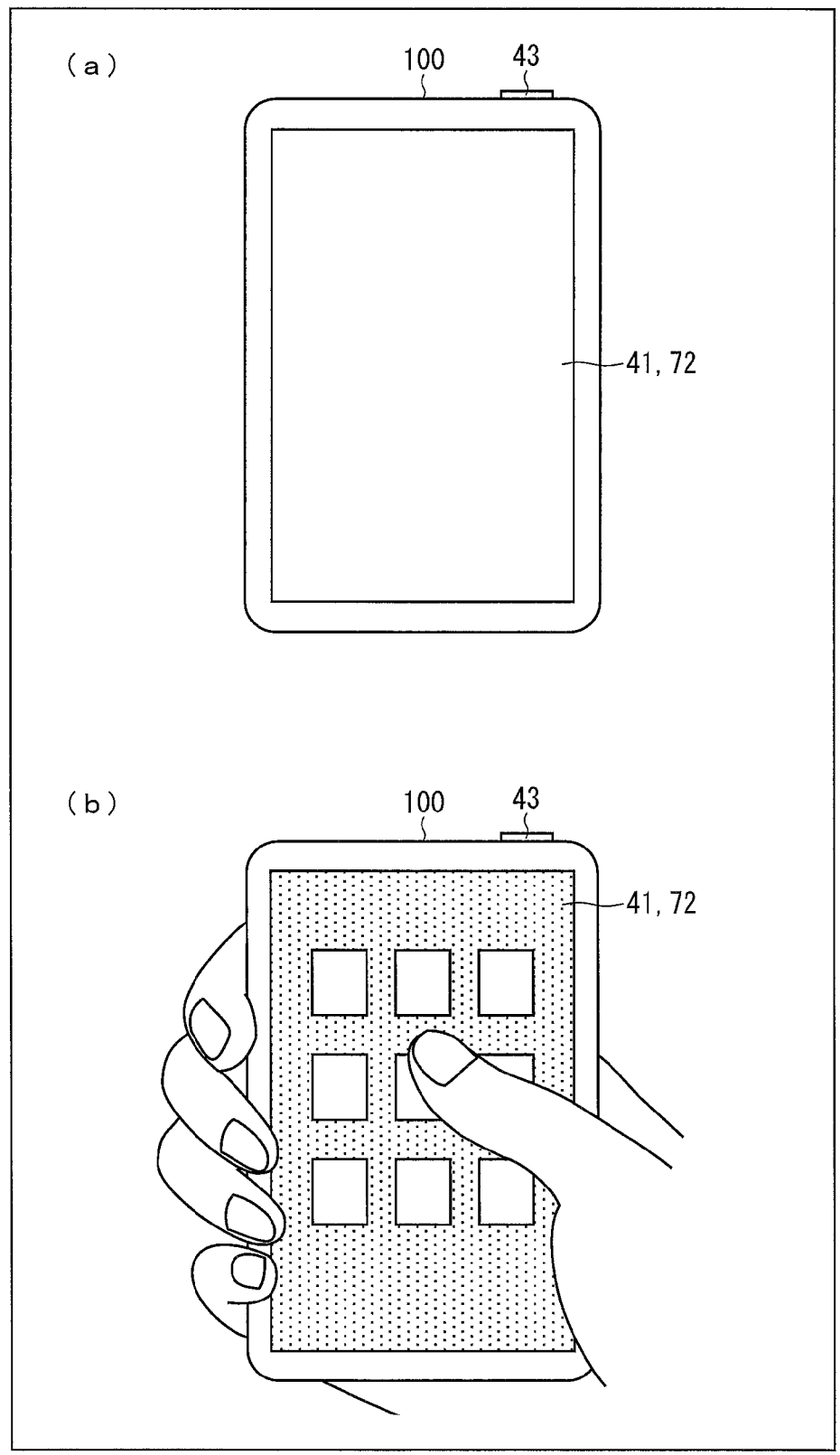

(a) of FIG. 5 is a view schematically illustrating an example of an appearance of the smartphone.

(b) of FIG. 5 is a view schematically illustrating an example where the smartphone is operated by a user.

Figure 6:
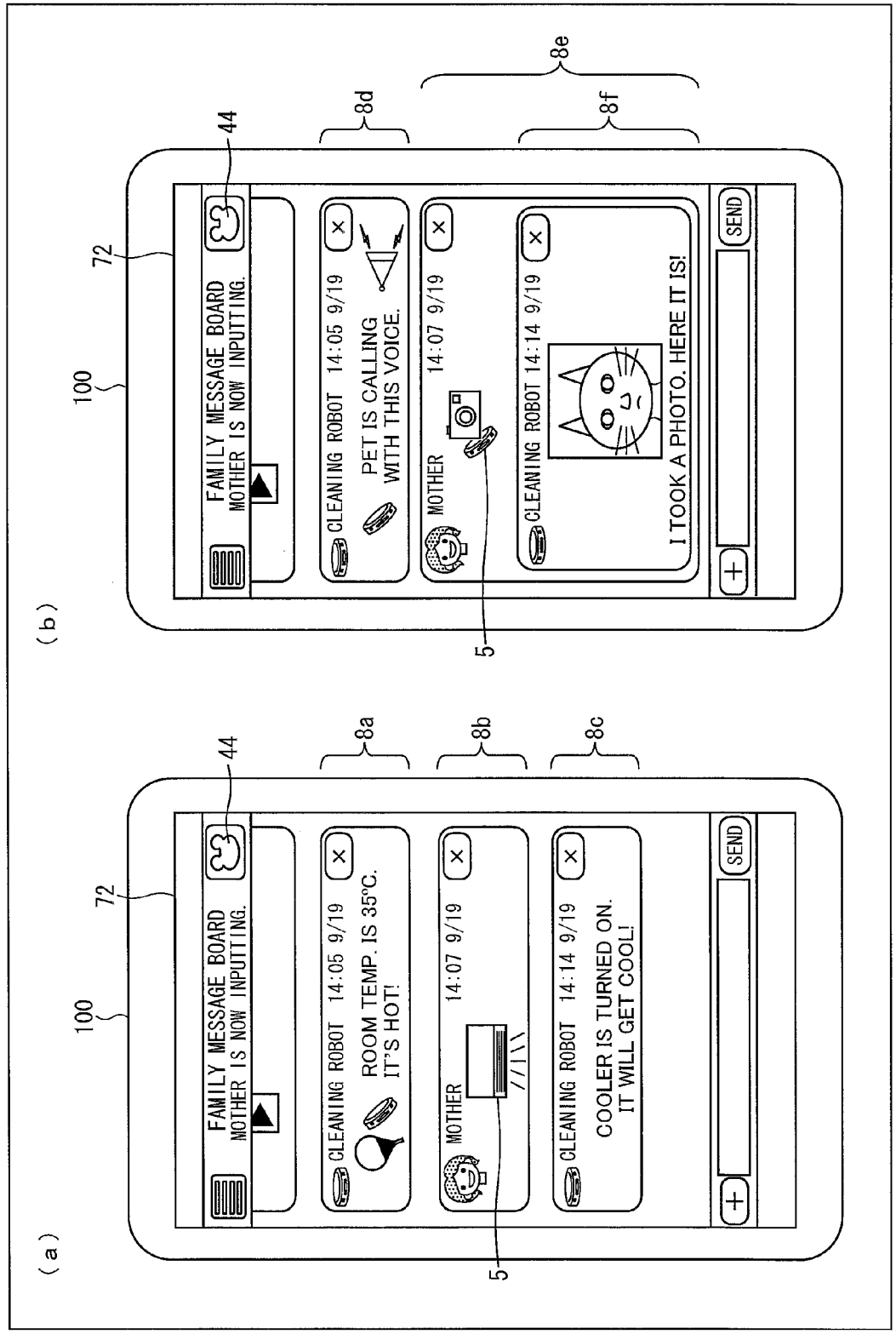

(a) and (b) of FIG. 6 are views each schematically illustrating how messages and images are exchanged between a user and the cleaning robot on the family message board.

Figure 7:
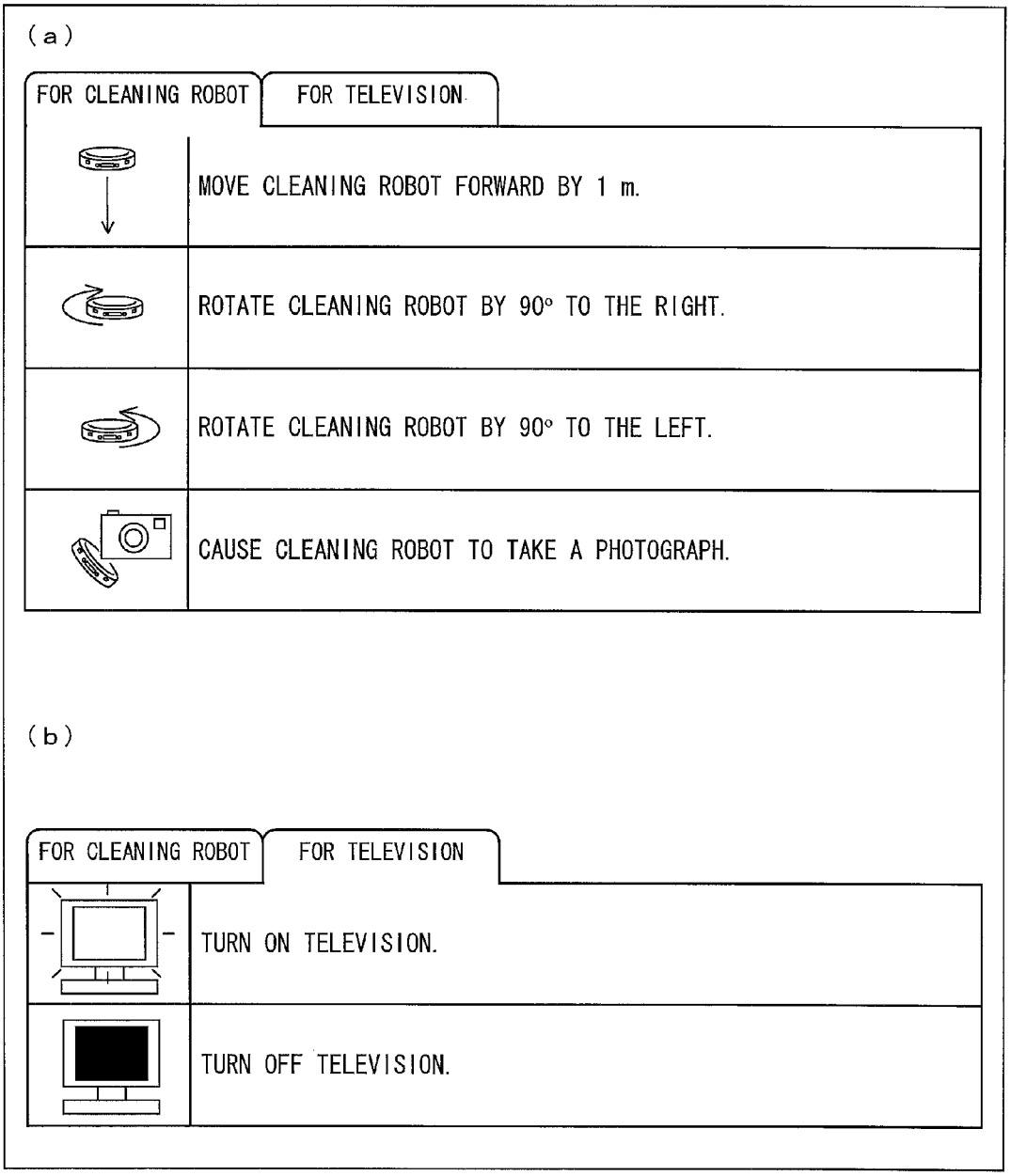

(a) and (b) of FIG. 7 are views each schematically illustrating an example of a screen showing a list of images selectable by a user.

Figure 8:
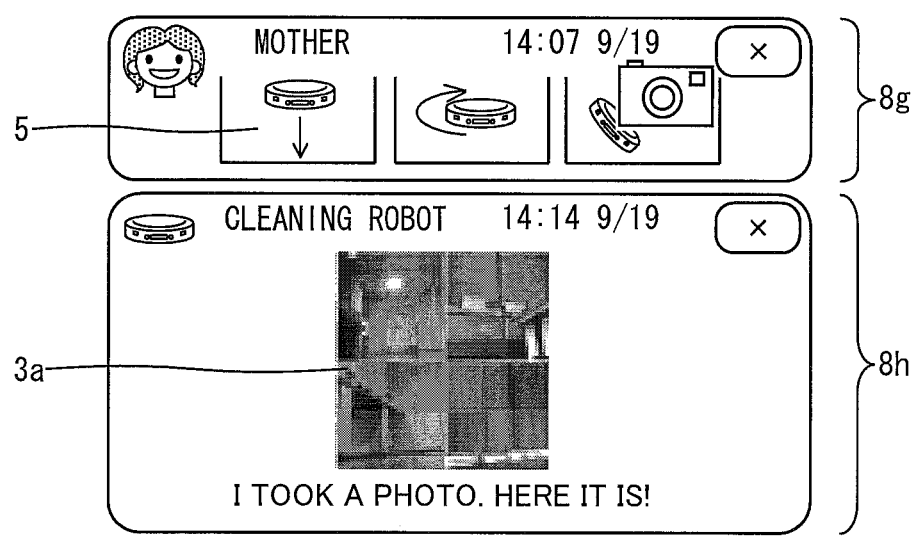

FIG. 8 is a view schematically illustrating the family bulletin board on which the cleaning robot contributes a result of execution of a series of processes specified by a plurality of images contributed by a user at once.

Figure 9:
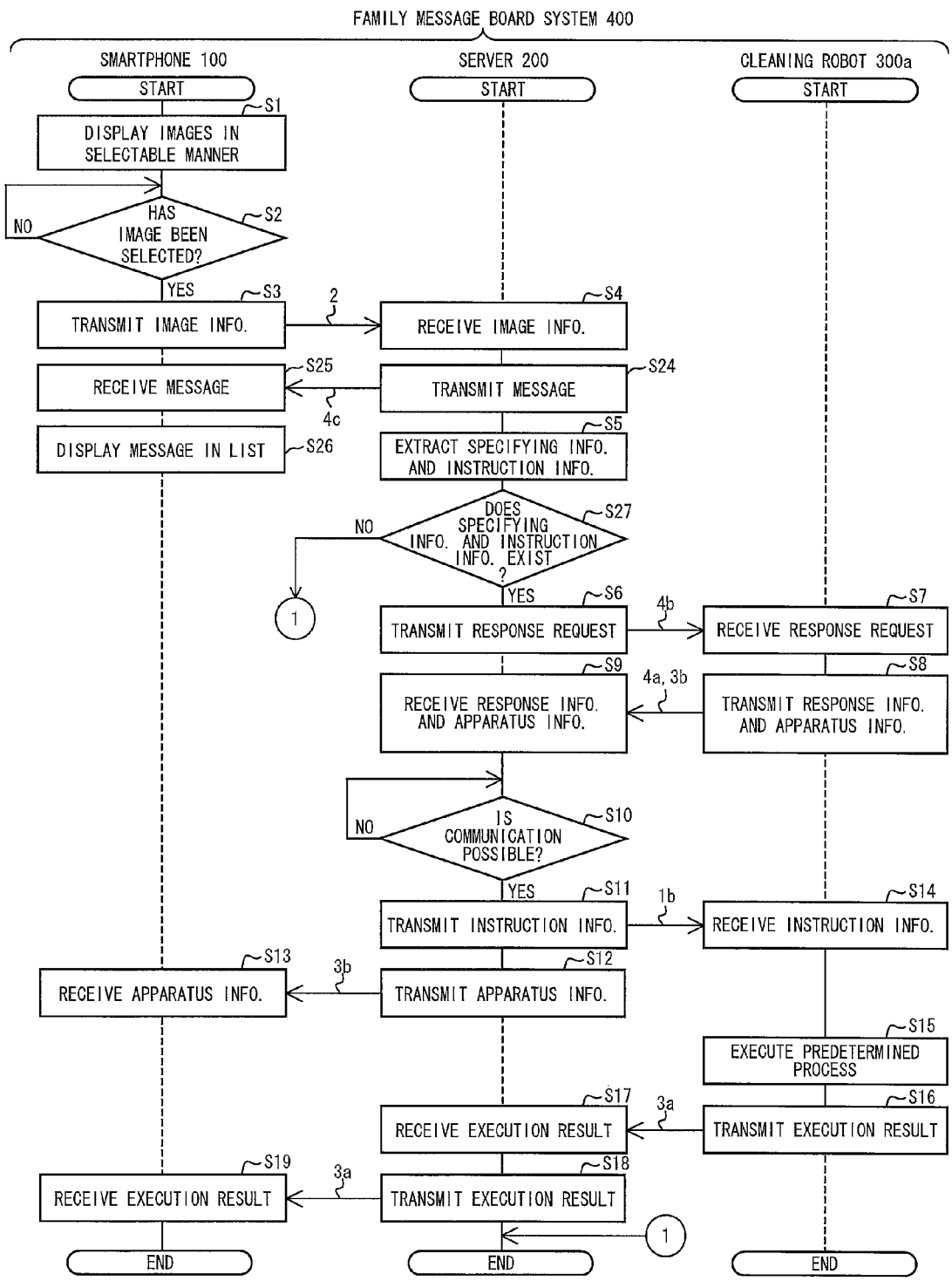

FIG. 9 is a flow chart of an example of a process executed in the family message board system.

Figure 10:
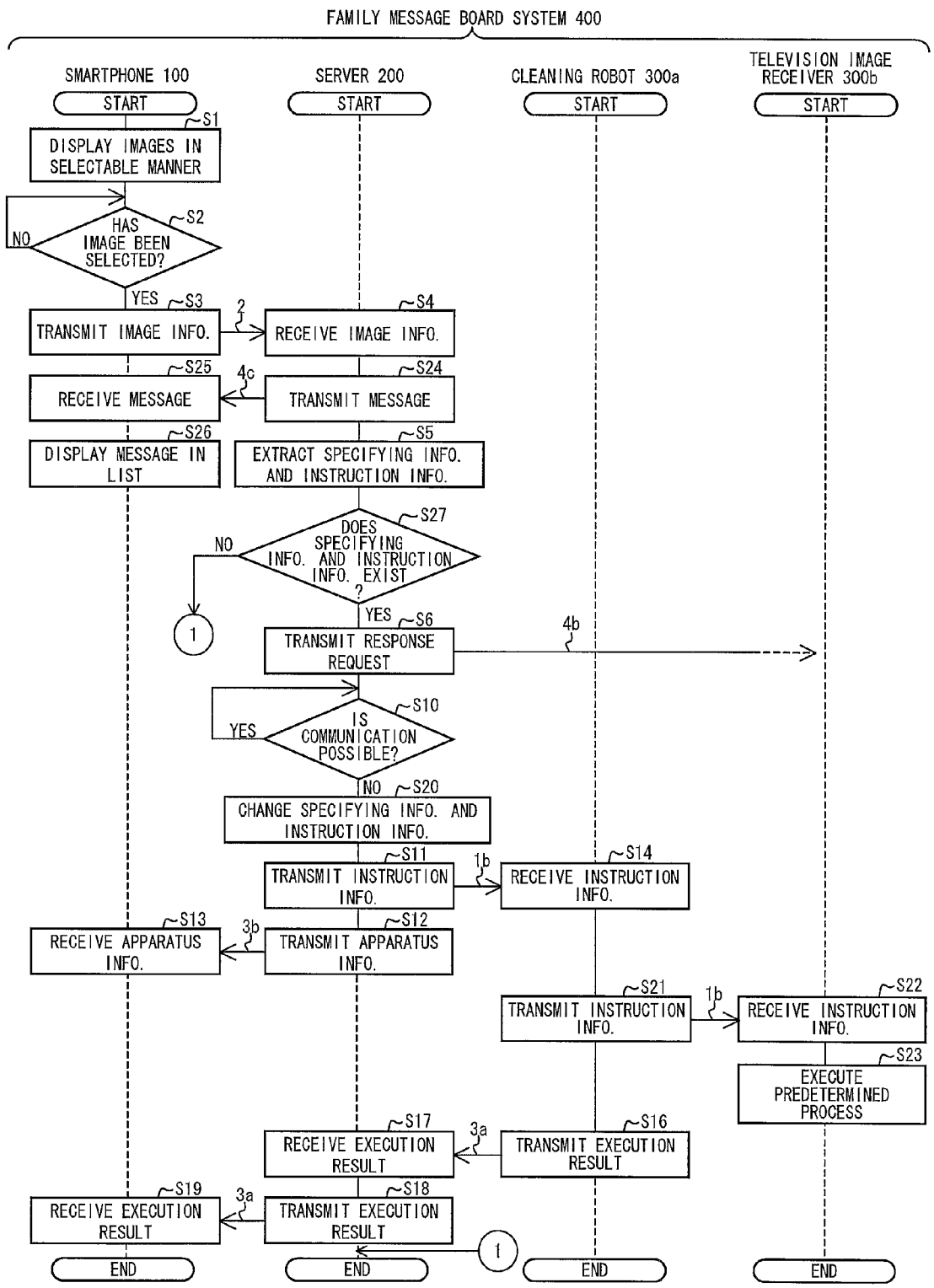

FIG. 10 is a flow chart of another example of a process executed in the family message board system.

DESCRIPTION OF EMBODIMENTS

With reference to FIGS. 1 through 10, embodiments of the present invention will be described in detail below.

[Outline of Family Message Board System 400]

With reference to FIG. 4, the following describes an outline of a family message board system 400 according to one embodiment of the present invention. FIG. 4 shows the outline of the family message board system 400.

The family message board system (control system) 400 is a system (a so-called social network service) providing an electronic message board that is shareable by users (in the example shown in FIG. 4, a father, a mother, and a child) having been registered in advance. The family message board system 400 includes smartphones 100a, 100b, and 100c, an apparatus controlling server 200a, a family message board server 200b, a home server 200c, a cleaning robot 300a, and apparatuses located in a home (hereinafter, such the apparatuses are referred to as "domestic apparatuses").

In the family message board system 400, the cleaning robot 300a or any of the domestic apparatuses writes a message on a family message board according to the state of the domestic apparatus and/or the content of a message written by any of the users. Further, any of the users can access the family message board so as to write or browse a message thereon/therefrom by use of one of the smartphones 100a, 100b, and 100c that is in the user's possession. Furthermore, any of the users can control operation of any of the domestic apparatuses by contributing an image to the family message board (this will be described in detail later with reference to FIG. 6).

The home server 200c is communicably and wirelessly connected to the cleaning robot 300a. Further, the home server 200c is communicably and wirelessly connected (or wire-connected) to the domestic apparatuses. FIG. 4 shows the example where the domestic apparatuses are a television 300b, an air conditioning apparatus 300c, an illumination apparatus 300d, and a video recording apparatus 300e. However, the types and the numbers of domestic apparatuses are not limited to those in this example.

As a personified character of the cleaning robot 300a, the apparatus controlling server 200a writes a message and/or the like on the family message board according to, e.g., the state of any of the domestic apparatuses, information obtained by any of the domestic apparatuses, and/or the content of a message written by a user. This allows the user to simulatively experience communication with the cleaning robot 300a on the family message board.

The apparatus controlling server 200a accepts an image contributed by any of the smartphones 100a, 100b, and 100c, and transmits instruction information associated with the image to the home server 200c, so as to control operation of a corresponding one of the cleaning robot 300a and the domestic apparatuses.

Note that the present embodiment deals with an example where the apparatus controlling server 200a has (i) a function of writing a message and/or the like on the family message board and (ii) a function of controlling operation of the cleaning robot 300a and the domestic apparatuses. However, these functions may be provided in separate servers.

The family message board server 200b carries out all processes regarding the family message board such as (i) providing a display of the family message board with each of the smartphones 100a, 100b, and 100c and (ii) management of a message and/or the like written on the family message board.

The home server 200c comprehensively controls exchange of information between (i) the cleaning robot 300a or any of the domestic apparatuses and (ii) the apparatus controlling server 200a. Specifically, the home server 200c controls operation of the cleaning robot 300a or any of the domestic apparatuses according to instruction information supplied from the apparatus controlling server 200a. Further, the home server 200c transmits, to the apparatus controlling server 200a, information obtained from the cleaning robot 300a and information obtained from the domestic apparatuses.

The air conditioning apparatus (controlled apparatus) 300c is an apparatus for carrying out air conditioning such as heating and cooling (hereinafter, such the apparatus is also referred to as an "air conditioner 300c"). The air conditioning apparatus 300c includes a temperature sensor, and transmits a detected room temperature to the home server 200c.

The illumination apparatus (controlled apparatus) 300d is an illumination apparatus including a light source such as an LED. Under control of the home server 200c, the illumination apparatus 300d can be turned on and off.

The television (controlled apparatus) 300b is a television image receiver (hereinafter, such the apparatus is also referred to as a "television image receiver 300b"). The video recording apparatus (controlled apparatus) 300e is an apparatus for recording a broadcasting program received by the television 300b. The television 300b and the video recording apparatus 300e can also be controlled by the home server 200c.

In the example shown in FIG. 4, all the domestic apparatuses are included in the network, and are communicably connected to the home server 200c. However, since the cleaning robot 300a is capable of relaying instruction information transmitted from the home server 200c to any of the domestic apparatuses, the domestic apparatuses may not be directly connected to the home server 200c.

For example, even in a case where the television image receiver 300b is not included in the network, causing the cleaning robot 300a to transmit the instruction information to the television image receiver 300b through IrDA or infrared rays allows the television image receiver 300b to execute a process included in the instruction information (e.g., a process of turning on the power or a process of switching the channel). An example of controlling the television image receiver 300b which is not included in the network will be described in detail later.

In the example shown in FIG. 4, the home server 200c transmits sensing data obtained by a sensor provided in the cleaning robot 300a or any of the domestic apparatuses, an operation log of any of the domestic apparatuses, and a photograph taken by any of the domestic apparatuses. However, information to be transmitted by the home server 200c is not limited to these. Furthermore, in a case where the comprehensive control by the home server 200c is not necessary (e.g., in a case where no domestic apparatus related to the family message board exists), the family message board system 400 may be configured such that no home server 200c is provided and the cleaning robot 300a exchanges information with the apparatus controlling server 200a.

[Outline of Smartphone 100]

With reference to FIG. 5, the following schematically describes (i) an example of an appearance of a smartphone 100 and (ii) an example where the smartphone 100 is operated. (a) of FIG. 5 is a view schematically illustrating the example of the appearance of the smartphone 100. (b) of FIG. 5 is a view schematically illustrating the example where the smartphone is operated by a user. Note that each of the smartphones 100a, 100b, and 100c shown in FIG. 4 has the same configuration as that of the smartphone 100 shown in FIG. 5.

The smartphone (control apparatus) 100 is an information terminal for controlling the cleaning robot 300a, the television image receiver 300b, and the like via the server 200.

As shown in (a) of FIG. 5, the smartphone 100 includes an input screen 41, a display screen 72, and a power switch 43.

As shown in (b) of FIG. 5, by touching the input screen 41 so as to specify a position in the input screen 41 with respect to the smartphone 100 (i.e., to give the smartphone 100 coordinates on the input screen 41), the user can give the smartphone 100 information of image selection, for example.

As described above, the smartphone 100 is the potable information terminal. Note here that the same functions of the smartphone 100 can be attained by, e.g., a mobile phone, a personal computer, or a tablet terminal. That is, the terminal may not be the smartphone, as long as the terminal is an apparatus capable of inputting and outputting necessary information.

[Outline of Server 200]

The server 200 is communicably connected to the smartphone 100, the cleaning robot 300a, and the domestic apparatuses. Namely, the following description will be made based on the assumption that the "server 200" comprehensively has the substantial functions of the apparatus controlling server 200a, the family message board server 200b, and the home server 200c shown in FIG. 4.

[Outline of Cleaning Robot 300a]

The cleaning robot (controlled apparatus) 300a is one of controlled apparatuses controlled by the smartphone 100 via the server 200. The cleaning robot 300a has a function of carrying out cleaning while the cleaning robot 300a is travelling.

The cleaning robot 300a further has, e.g., a function of storing an operation log, a function of detecting and outputting a remaining charge level, a function of taking an image, a function of recognizing a voice, and a function of outputting a voice. Further, the cleaning robot 300a has a function of transmitting a control signal to any of the domestic apparatuses so as to operate the domestic apparatus.

[Control of Apparatus by Contribution of Image 5]

With reference to FIG. 6, the following schematically describes a flow of a series of processes executed in the family message board system 400 in order to control the cleaning robot 300a or any of the domestic apparatuses in response to an image 5 contributed on the family message board by the user. (a) and (b) of FIG. 6 are views each schematically illustrating how messages and images 5 are exchanged between a user (mother) and the cleaning robot 300a on the family message board.

As shown in (a) of FIG. 6, the cleaning robot 300a measures a room temperature with a temperature sensor, and contributes, on the family message board, a message 8a telling that "it is hot" in human sense. Upon reading this message, the user contributes, on the family message board, an image 5 instructing the air conditioner 300c to turn on an air-cooling function as a message 8b.

Namely, in response to user's touch on an image selecting button 44, the smartphone 100 displays a plurality of images selectable by the user, and transmits to the server 200 image information 2 indicative of the image 5 selected by the user among the images.

Note that the image 5 is associated with (i) specifying information 1a for specifying a control target (controlled apparatus) and (ii) instruction information 1b for instructing the control target to execute a predetermined process. In the example shown in (a) of FIG. 6, the specifying information 1a, which is associated with the image 5, indicates the "air conditioner 300c", and the instruction information 1b indicates the instruction to "turn on an air-cooling function".

The image information 2 is information by which the image 5 can be uniquely identified. The image information 2 may take any form, as long as the image 5 can be uniquely identified by the image information 2. For example, the image information 2 may be constituted by a numeral(s) or a character(s). In a case where the smartphone 100 and the server 200 have the same directory structure for storing the image 5, the image information 2 may be a name of a path for storing the image. Alternatively, the image information 2 may be the image 5 itself (in this case, the smartphone 100 transmits the image 5 to the server 200).

Here, upon reception of the image information 2, the server 200 transmits the message 8b to the plurality of smartphones 100 as contribution information 4c, in order to allow information that the instruction has been given by the smartphone 100 with use of the image information 2 to be shared by users of other smartphones. Note that the message 8b (contribution information 4c) may include, in addition to the image 5, information that is related to the message 8b and is added by the server 200 (e.g., information by which the user contributed the message 8b is identified and/or the date and time of the contribution).

Further, upon reception of the image information 2, the server 200 transmits, to the apparatus specified by the specifying information 1a associated with the image 5 indicated by the image information 2, the instruction information 1b for instructing the apparatus to execute the predetermined process. In the example shown in (a) of FIG. 6, the server 200 transmits, to the "air conditioner 300c" specified by the specifying information 1a, the instruction information 1b for instructing the air conditioner 300c to "turn on the cooling function".

Upon reception of the instruction information 1b, the air conditioner 300c executes the process of "turning on the cooling function". After that, the cleaning robot 300a contributes, on the family message board, a message 8c telling that he is happy about the room being cooled.

As shown in (b) of FIG. 6, the cleaning robot 300a records a voice of a pet taken with a microphone. Further, on the family message board, the cleaning robot 300a contributes (i) a message 8d informing that the pet is calling and (ii) an audio file. Upon reading the message and listening to the recorded voice, a user contributes, on the family message board, an image 5 instructing the cleaning robot 300a to take a photograph of the surroundings as a message 8e.

Namely, as well as in the above-described operation, in response to user's touch on the image selecting button 44, the smartphone 100 displays a plurality of images selectable by the user, and transmits to the server 200 image information 2 indicative of the image 5 selected by the user among the images.

Upon reception of instruction information 1b for giving an instruction to "take a photograph of the surroundings" via the server 200, the cleaning robot 300a executes the process of taking a photograph, and contributes, on the family message board, (i) a taken image (result of execution of the process) and (ii) a message 8f informing that the cleaning robot 300a has taken the photograph.

Here, the smartphone 100 may display, in the vicinity of the message 8e, the taken image obtained from the cleaning robot 300a via the server 200. With this, the smartphone 100 can allow the user to recognize that the taken image and the message 8f are a response of the cleaning robot 300a to the message 8e (i.e., association between the message 8e and the result of execution of the process).

To summarize the above-described outline, the smartphone 100 executes a process in the following steps of: (1) displaying images 5 in such a manner as to be selectable by a user, each of the images 5 being associated with (i) a piece of specifying information 1a for specifying a corresponding one of the cleaning robot 300a and the domestic apparatuses and (ii) a piece of instruction information 1b for instructing the corresponding one of the cleaning robot and the domestic apparatuses to execute a predetermined process; and (2), in a case where the user selects at least one of the images 5 thus displayed, transmitting a piece of image information 2 indicative of the at least one of the images 5 to the server 200, so as to cause any of the cleaning robot and the domestic apparatuses specified by the piece of specifying information 1a to execute a predetermined process specified by the piece of instruction information 1b.

According to the above-described conventional technique, an image includes only the instruction information, and therefore a user must specify an external apparatus which is to be operated. Namely, the user is forced to carry out an explicit operation of specifying the apparatus which is to be operated and transmitting an instruction to the apparatus thus specified.

However, what is truly required by the user is a "function" that is provided by the external apparatus. In some cases, the apparatus that plays a main role in order to provide the "function" may be arbitrary one. Thus, the interface always forcing the user to carry out such the explicit operation is not user-friendly.

On the other hand, the smartphone 100 transmits, to the server 200, the image information 2 indicative of the image 5 associated with the specifying information 1a and the instruction information 1b. Namely, since the smartphone 100 always transmits the image information 2 to the "server 200", the smartphone 100 does not require the user to carry out the explicit operation of "specifying the external apparatus".

In other words, the smartphone 100 allows the user to control the cleaning robot or any of the domestic apparatuses even if the user does not carry out the explicit operation of specifying the cleaning robot 300a or any of the domestic apparatuses, which is a control target. With this, the smartphone 100 provides improved user's convenience.

[Configuration of Smartphone 100]

Figure 1:
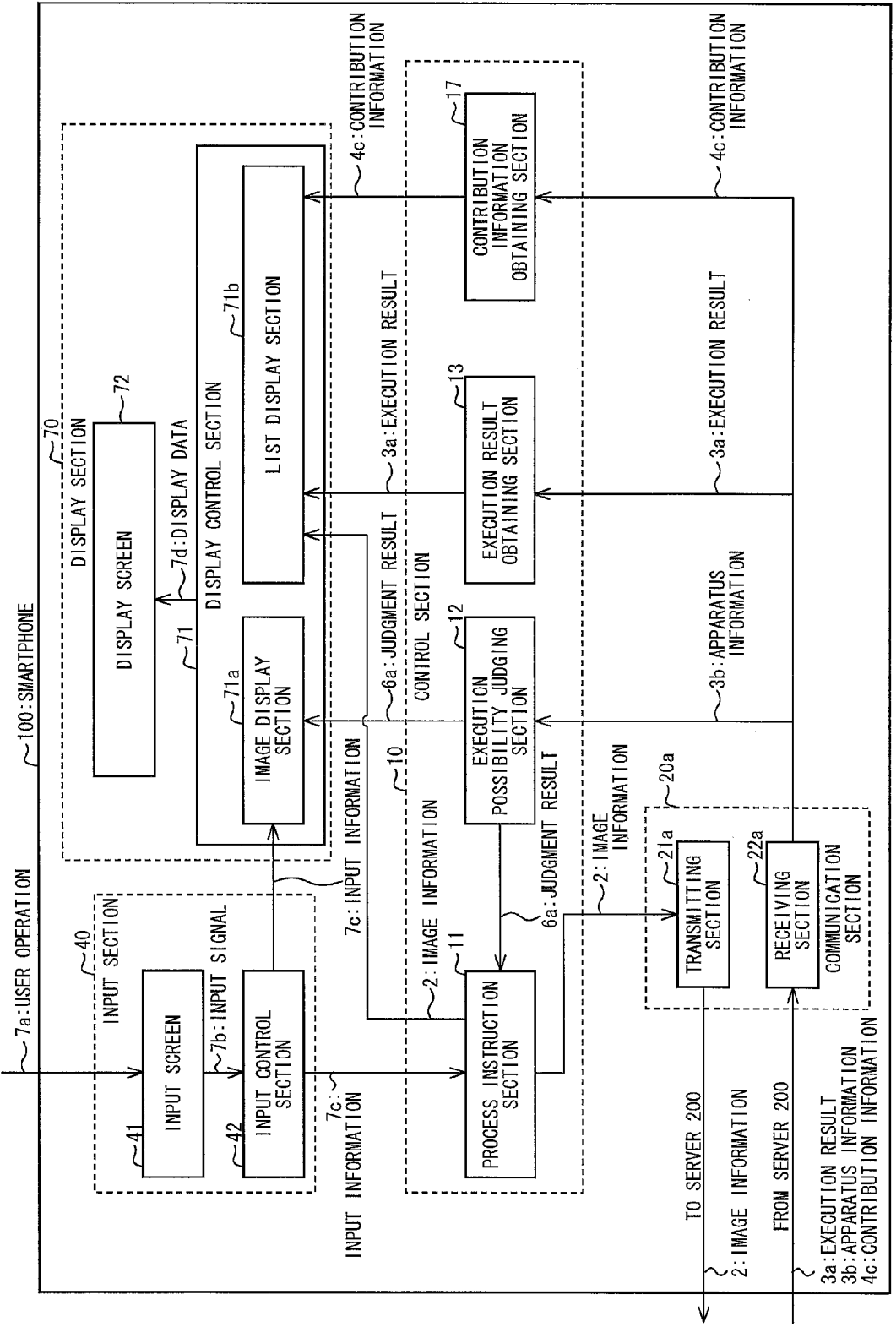
FIG. 1 is a block diagram illustrating a main part of a configuration of a smartphone according to one embodiment of the present invention.

With reference to FIG. 1, the following describes a configuration of the smartphone 100. FIG. 1 is a block diagram illustrating a main part of the configuration of the smartphone 100. Note here that parts being not directly related to the present embodiment (e.g., a part enabling a telephone call through a telephone line) are omitted in the following description of the configuration and the block diagram in FIG. 1. However, according to the actual condition in which the smartphone 100 is worked, the smartphone 100 may include the omitted parts.

In order to simplify the description, the following description of the block diagram will be made based on the assumption that the family message board system 400 (see FIG. 4) only includes the smartphone (control apparatus) 100, the server 200, the cleaning robot (controlled apparatus) 300a, and the television image receiver (controlled apparatus) 300b. Further, the description will be made also based on the assumption that the television image receiver 300b is not included in the network and cannot receive the instruction information 1b from the server 200.

In the following description, functions of an input section 40 (an input screen 41 and an input control section 42), a control section 10 (a process instruction section 11, an execution possibility judging section 12, an execution result obtaining section 13, and a contribution information obtaining section 17), a communication section 20a (a transmitting section 21a and a receiving section 22a), and a display section 70 (a display control section 71 and a display screen 72) will be explained in this order.

The input section 40 accepts an operation carried out by a user (user operation 7a). The input section 40 includes the input screen 41 and the input control section 42.

The input screen 41 outputs, to the input control section 42, an input signal 7b indicative of a position on the input screen 41 which position is specified by the user operation 7a. In the present embodiment, the input screen 41 is preferably a touch panel capable of detecting multi-touch operation. However, the type of hardware of the input screen 41 is not limited to the touch panel, as long as the input screen 41 is an input device capable of detecting the position of the touch made by the user operation 7a.

The input control section 42 generates input information 7c based on the input signal 7b supplied from the input screen 41, and outputs the input information 7c to an image display section 71a and the process instruction section 11. Here, the input information 7c includes at least (i) information that the image selecting button 44 has been touched by the user and (ii) information that an image 5 has been selected by the user.

The control section 10 comprehensively controls various kinds of functions of the smartphone 100. The control section 10 includes the process instruction section 11, the execution possibility judging section 12, the execution result obtaining section 13, and the contribution information obtaining section 17.

In a case where at least one of images 5 displayed by the image display section 71a is selected by the user, the process instruction section (instruction means) 11 transmits image information 2 indicative of the selected image 5 to the server 200, so as to cause the cleaning robot 300a or the domestic apparatus specified by specifying information 1a associated with the selected image 5 to execute a predetermined process specified by the instruction information 1b.

Specifically, upon receiving, from the input control section 42, the input information 7c indicating that the image 5 is selected by the user, the process instruction section 11 outputs the image information 2 indicative of the selected image 5 to the transmitting section 21a.

Note that, in a case where a plurality of ones of the images 5 are selected by the user, the process instruction section 11 transmits, to the server 200, a plurality of pieces of image information 2 indicative of the respective plurality of ones of the images 5, so as to cause the cleaning robot 300a and/or the domestic apparatus specified by pieces of specifying information 1a associated with the respective plurality of ones of the images 5 to sequentially execute predetermined processes specified by pieces of instruction information 1b associated with the respective plurality of ones of the images 5. This process will be described in detail later.

Upon reception of apparatus information 3b from the receiving section 22a, the execution possibility judging section (first judging means) 12 judges whether or not the cleaning robot 300a or the domestic apparatus can execute the predetermined process, according to the apparatus information 3b. Then, the execution possibility judging section 12 outputs a judgment result 6a thereof to the process instruction section 11 and the image display section 71a.

The apparatus information 3b includes information related to a function of an apparatus and a process that the apparatus is executing. For example, the apparatus information 3b includes (i) information that the video recording apparatus 300e has such a function of recording a program and another program in the same time slot on a different channel, (ii) information that some functions of the air conditioner 300c are disabled because a filter of the air conditioner 300c is soiled, or (iii) information that the cleaning robot 300a is taking a photograph.

The execution possibility judging section 12 judges whether or not the apparatus can execute the predetermined process specified by the instruction information 1b associated with the image 5 under the state of the apparatus indicated by the apparatus information 3b. For example, in a case where the apparatus information 3b indicates that "the cleaning robot 300a is taking a photograph", the execution possibility judging section 12 determines that the cleaning robot 300a cannot execute a process of "cleaning".

The execution result obtaining section (obtaining means) 13 obtains a result (execution result 3a) of execution of the predetermined process carried out by the cleaning robot 300a or the domestic apparatus from the server 200 via the receiving section 22a, and outputs the execution result 3a to a list display section 71b.

For example, in a case where the user causes the cleaning robot 300a to execute a process of "taking a photograph of the surroundings", the execution result 3a is an image that is taken by the cleaning robot 300a and transmitted via the server 200.

In a case where contribution information 4c is supplied from the receiving section 22a to the contribution information obtaining section 17, the contribution information obtaining section 17 outputs the contribution information 4c to the list display section 71b. Note here that the contribution information 4c is information including the message 8b (see (a) of FIG. 6) so as to allow information that the instruction is given by one smartphone 100 with use of the image information 2 to be shared by users of other smartphones, the message 8b being transmitted from the server 200 which has received the image information 2.

The communication section 20a communicates with an entity on the outside via a communication network that complies with a predetermined communication protocol. A communication line, a communication mode, or a communication medium is not particularly limited, as long as it has a substantial function for enabling communication with an external apparatus. The communication section 20a can be made of, e.g., a device such as an Ethernet (Registered Trademark) adapter. The communication section 20a can use, e.g., a communication mode and/or a communication medium such as IEEE 802.11 wireless or Bluetooth (Registered Trademark). The communication section 20a includes the transmitting section 21a and the receiving section 22a.

The transmitting section 21a transmits, to the server 200, the image information 2 supplied from the process instruction section 11.

The receiving section 22a receives the execution result 3a, the apparatus information 3b, and the contribution information 4c each of which is transmitted from the server 200, and outputs the execution result 3a, the apparatus information 3b, and the contribution information 4c to the execution result obtaining section 13, the execution possibility judging section 12, and the contribution information obtaining section 17, respectively.

The display section 70 shows, to the user, the family message board and contents included in the family message board (e.g., a message and/or an image). The display section 70 includes the display control section 71 and the display screen 72.

The display control section 71 outputs, to the display screen 72, display data 7d so that the family message board and the contents included in the family message board are displayed on the display screen 72. The display data 7d may be, for example, an image according to a bitmap format, an image according to any other format, or data according to a format suitable for displaying. The display control section 71 includes the image display section 71a and the list display section 71b.

The image display section (first display means) 71a displays the images 5 in such a manner as to be selectable by the user, each of the images 5 being associated with the specifying information 1a and the instruction information 1b. Specifically, upon receiving, from the input control section 42, the input information 7c indicating that the image selecting button 44 is touched by the user, the image display section 71a displays the plurality of images 5 selectable by the user.

In a case where a judgment result 6a indicating that a predetermined process specified by instruction information 1b associated with one of the images 5 cannot be executed by the specified apparatus is supplied from the execution possibility judging section 12 to the image display section 71a, the image display section 71a does not display the one of the images 5 associated with that predetermined process, or displays the one of the images 5 in a reduced brightness.

With reference to FIG. 7, the following describes an example of an interface for selection displayed on the display screen 72 in the case where the images 5 are displayed in such a manner as to be selectable. (a) and (b) of FIG. 7 are views each schematically illustrating an example of a screen showing a list of images selectable by a user.

As shown in (a) of FIG. 7, the smartphone 100 (image display section 71a) displays the images 5 in such a manner as to be viewed at a glance (e.g., in a list), each of the images 5 expressing a process that the user can instructs the cleaning robot 300a to execute. As described above, according to the state of the cleaning robot 300a (i.e., whether or not the cleaning robot 300a can execute the processes expressed by the images 5), the display of the list is changed.

For example, in a case where the apparatus information 3b indicates that "the cleaning robot 300a is taking a photograph" and therefore the execution possibility judging section 12 determines that the cleaning robot 300a cannot execute a process of "cleaning", an option to "cause the cleaning robot to carry out cleaning" is displayed in an unselectable manner (e.g., this option is not displayed or is displayed in a reduced brightness).

In a case where the user attempts to select the image 5 displayed in the unselectable manner, the cleaning robot 300a may contributes, e.g., a message "I will do it after five minutes. OK?" on the family message board, so as to prompt the user to wait for a while for execution.

As shown in (b) of FIG. 7, the smartphone 100 (image display section 71a) displays the images 5 in such a manner as to be viewed in a list, each of the images 5 expressing a process that the user can instruct a domestic apparatus (here, the television image receiver 300b) to execute.

Note here that the images displayed in the list are not changed in dependence on whether the television image receiver 300b is in a state (1) in which the television image receiver 300b is included in the network and can receive the instruction information 1b from the server 200 or a state (2) in which the television image receiver 300b is not included in the network and cannot receive the instruction information 1b from the server 200. The reason for this is as follows: Even in the state (2), causing the cleaning robot 300a to relay the instruction information 1b to the television image receiver 300b allows the user to control the television image receiver 300b in a similar manner to the state (1).

Namely, in a case where the user attempts to control the television image receiver 300b to turn on the television image receiver 300b in the state (2), the smartphone 100 can transmit, to the server 200, image information 2 of the image 5 associated with (i) specifying information 1a specifying the "cleaning robot 300a" and (ii) instruction information 1b giving an instruction to "turn on the television image receiver 300b". Upon reception of the instruction information 1b via the server 200, the cleaning robot 300a moves to a position at which the cleaning robot 300a can transmit the instruction information 1b to the television image receiver 300b through IrDA or infrared rays, and then executes the process of "turning on the television image receiver 300b".

In this manner, the cleaning robot 300a relays the instruction information 1b from the server 200 to the domestic apparatus. This allows the user to control that domestic apparatus via the smartphone 100 without considering whether the domestic apparatus is the state (1) or the state (2). Note that, according to the state, a process of changing the specifying information 1a and the instruction information 1b may be executed by an information extraction section 16 in the server 200 (this will be described in detail later).

The list display section (second display means) 71b displays, as information having been shared by the users, pieces of information in time series in such a manner as to be viewed at a glance, the pieces of information including at least one piece of image information 2 transmitted by the process instruction section 11 (see (a) and (b) of FIG. 6). Note that, in a case where the execution result obtaining section 13 obtains an execution result 3a, the list display section 71b may further display the execution result 3a in the vicinity of a message and an image 5 that are displayed in such a manner as to be viewed in a list (see (b) of FIG. 6).

The display screen 72 displays the display data 7d supplied from the display control section 71. In the present embodiment, mainly assumed as the display screen 72 is a liquid crystal display (LCD). However, the type of hardware of the display screen 72 is not particularly limited, as long as the display screen 72 is an apparatus having a display function (for example, the display screen 72 is an apparatus including a driver circuit for driving a display element based on the display data 7d supplied from the display control section 71).

In order to clearly indicate the functions of the respective configurations, the input screen 41 and the display screen 72 are separately shown in FIG. 1. However, in a case where, for example, the input screen 41 is a touch panel and the display screen 72 is a liquid crystal display, the input screen 41 and the display screen 72 may be integrated with each other as shown in (a) of FIG. 5. With this configuration, (i) a position at which the user's finger comes into contact with the input screen 41 coincides with (ii) a position at which, e.g., a figure is displayed in the display screen 72 in response to the contact. As a result, the user can attain a natural feeling during input operation.

[Configuration of Server 200]

Figure 2:
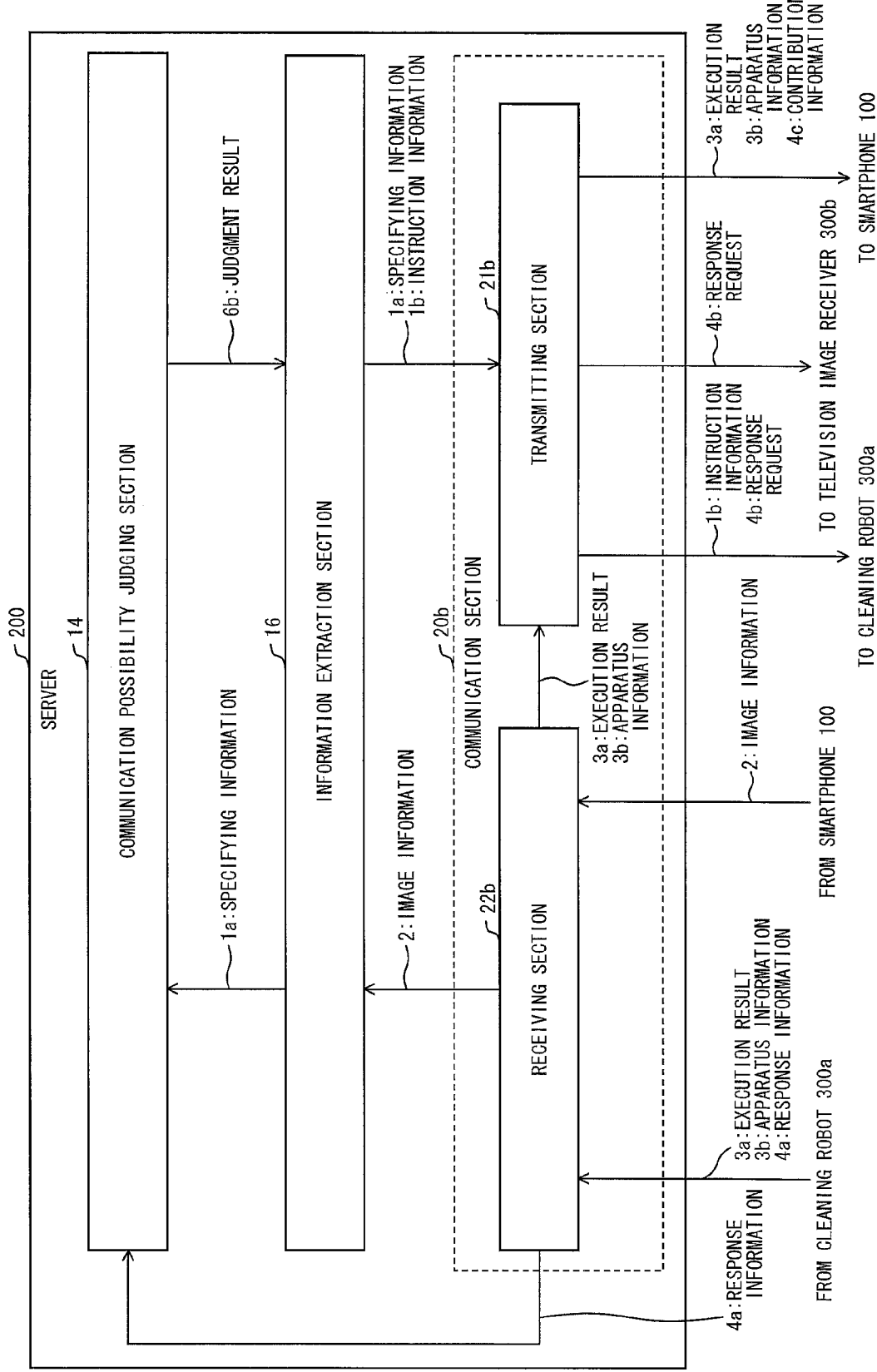
FIG. 2 is a block diagram illustrating a main part of a configuration of a server according to one embodiment of the present invention.

With reference to FIG. 2, the following describes a configuration of the server 200. FIG. 2 is a block diagram illustrating a main part of the configuration of server 200. In the following description, functions of a communication section 20b (a transmitting section 21b and a receiving section 22b), a communication possibility judging section 14, and the information extraction section 16 will be explained in this order.

The communication section 20b has the same function as that of the communication section 20a, and therefore detailed description of the communication section 20b is omitted here. The communication section 20b includes the transmitting section 21b and the receiving section 22b.

The transmitting section (first transmitting means) 21b transmits, to the cleaning robot 300a or the domestic apparatus specified by specifying information 1a associated with an image 5 indicated by image information 2 received by the receiving section 22b, instruction information 1b giving an instruction to execute a predetermined process.

Further, in order to check if the domestic apparatus is included in the network and is in a state that the domestic apparatus can receive the instruction information 1b from the server 200 (i.e., whether the domestic apparatus is in the state (1) or the state (2)), the transmitting section 21b transmits a response request 4b to the domestic apparatus. Further, in a case where the transmitting section 21b receives an execution result 3a or apparatus information 3b from the receiving section 22b, the transmitting section 21b transmits the execution result 3a or the apparatus information 3b to the smartphone 100.

Furthermore, in order that a plurality of smartphones 100 can display a message, the transmitting section 21b generates a message including the image 5 received by the receiving section 22b (e.g., the message 8b in (a) of FIG. 6), and transmits contribution information 4c to all of the plurality of smartphones 100.

The receiving section (first receiving means) 22b receives, from the smartphone 100, the image information 2 indicative of the image 5 selected by the user, and outputs the image information 2 to the information extraction section 16. In a case where the receiving section 22b receives an execution result 3a or apparatus information 3b from the cleaning robot 300a, the receiving section 22b outputs the execution result 3a or the apparatus information 3b to the transmitting section 21b. In a case where the receiving section 22b receives response information 4a, the receiving section 22b outputs the response information 4a to the communication possibility judging section 14.

Note here that the response information 4a is information obtained in response to the response request 4b that is transmitted from the transmitting section 21b to the cleaning robot 300a or the domestic apparatus. Namely, the response information 4a indicates that the cleaning robot 300a or the domestic apparatus is included in the network, and the cleaning robot 300a or the domestic apparatus is in a state that the cleaning robot 300a or the domestic apparatus can receive the instruction information 1b from the server 200 (the above-described state (i)).

Specifically, in the case where the cleaning robot 300a or the domestic apparatus is in the state (1), the receiving section 22b receives the response information 4a from the cleaning robot 300a or the domestic apparatus. Thus, the receiving section 22b outputs, to the communication possibility judging section 14, the response information 4a indicating that the cleaning robot 300a or the domestic apparatus is in the state (1). On the other hand, in a case where the cleaning robot 300a or the domestic apparatus is in the state (2), the receiving section 22b does not receive the response information 4a from the cleaning robot 300a or the domestic apparatus. Namely, according to the fact that the response information 4a is not supplied from the cleaning robot 300a or the domestic apparatus even after a predetermined period of time has elapsed, the communication possibility judging section 14 can determine that the cleaning robot 300a or the domestic apparatus is in the state (2).

Herein, the cleaning robot 300a is in the state (1). Therefore, upon reception of the response information 4a from the cleaning robot 300a, the receiving section 22b outputs the response information 4a to the communication possibility judging section 14. On the other hand, since the television image receiver 300b is assumed to be in the state (2) as described above, the receiving section 22b does not receive the response information 4a from the television image receiver 300b.

In a case where the communication possibility judging section (second judging means) 14 receives the specifying information 1a from the information extraction section 16 and the response information 4a from the receiving section 22b, the communication possibility judging section 14 outputs, to the information extraction section 16, a judgment result 6b indicating that the cleaning robot 300a or the domestic apparatus specified by the specifying information 1a is communicably connected to the server 200 (i.e., the cleaning robot 300a or the domestic apparatus specified by the specifying information 1a is in the state (1)).

On the other hand, in a case where the communication possibility judging section 14 receives the specifying information 1a from the information extraction section 16 and does not receive the response information 4a from the receiving section 22b, the communication possibility judging section 14 outputs, to the information extraction section 16, a judgment result 6b indicating that the cleaning robot 300a or the domestic apparatus specified by the specifying information 1a is not communicably connected to the server 200 (i.e., the cleaning robot 300a or the domestic apparatus specified by the specifying information 1a is in the state (2)).

Upon reception of the image information 2 from the receiving section 22b, the information extraction section 16 extracts, from the image 5 indicated by the image information 2, the specifying information 1a and the instruction information 1b each of which is associated with the image 5. Then, the information extraction section 16 outputs the specifying information 1a to the communication possibility judging section 14 and to the transmitting section 21b, and outputs the instruction information 1b to the transmitting section 21b.

Here, each of the specifying information 1a and the instruction information 1b is associated with the image 5 in the following manner. For example, the specifying information 1a and the instruction information 1b are stored in meta content (e.g., an Exif header) of data of the image 5.

Alternatively, the image 5 may be associated with the specifying information 1a and the instruction information 1b by use of a name of a path for storing the image 5. For example, a path "/image/cleaner/photo.jpg" may indicate an instruction to cause the cleaning robot 300a to take a photograph, a path "/image/cleaner/moveForward.jpg" may indicate an instruction to move the cleaning robot 300a forward, a path "/image/tv/on.jpg" may indicate an instruction to turn on the television image receiver 300b, and a path "/image/tv/off.jpg" may indicate an instruction to turn off the television image receiver 300b.

In a case where the judgment result 6b supplied from the communication possibility judging section 14 indicates that the cleaning robot 300a or the domestic apparatus specified by the specifying information 1a is in the state (2), the information extraction section 16 may change the specifying information 1a and the instruction information 1b.

For example, in a case where the specifying information 1a specifies the "television image receiver 300b" and the instruction information 1b instructs to "turn on", the information extraction section 16 changes the specifying information 1a so that the specifying information 1a specifies the "cleaning robot 300a" and changes the instruction information 1b so that the instruction information 1b gives an instruction to "turn on the television image receiver 300b", since the television image receiver 300b is determined to be in the state (2).

Namely, the server 200 further includes the communication possibility judging section (second judging means) 14 for judging whether or not the domestic apparatus (controlled apparatus) is communicably connected to the server 200. In a case where the communication possibility judging section (second judging means) 14 determines that the domestic apparatus (controlled apparatus) is not connected to the server 200, the transmitting section (first transmitting means) 21b causes the cleaning robot (another controlled apparatus) 300a communicably connected to the server 200 and to the domestic apparatus (controlled apparatus) to relay the instruction information 1b instructing execution of a predetermined process to the domestic apparatus (controlled apparatus), so that the instruction information 1b instructing execution of the predetermined process is transmitted to the domestic apparatus (controlled apparatus).

FIG. 2 does not show transmission/reception of any message (e.g., a message contributed by user's entering of texts or a photograph contributed by a user) except for the image information 2 supplied to the server 200. However, in a case where either of the specifying information 1a and the instruction information 1b cannot be extracted by the information extraction section 16, the transmitting section 21b transmits simply a message received by the receiving section 22b so that the message can be displayed by the smartphone 100.

[Configuration of Cleaning Robot 300a]

With reference to (a) of FIG. 3, the following describes a configuration of the cleaning robot 300a. (a) of FIG. 3 is a block diagram illustrating a main part of the configuration of the cleaning robot 300a. In the following description, functions of a communication section 20c (a transmitting section 21c, a receiving section 22c, and a receiving section 22d) and a process executing section 15a will be explained in this order.

The communication section 20c has the same function as that of the communication section 20a, and therefore detailed description of the communication section 20c is omitted here. The communication section 20c includes the transmitting section 21c and the receiving section 22c.

Upon reception of instruction information 1b from the receiving section 22c, the transmitting section (second transmitting means) 21c transmits the instruction information 1b to the domestic apparatus (television image receiver 300b). Upon reception of a response request 4b from the receiving section 22c, the transmitting section 21c transmits the response information 4a or apparatus information 3b to the server 200. Further, upon reception of an execution result 3a from the process executing section 15a, the transmitting section 21c transmits the execution result 3a to the server 200.

The receiving section (second receiving means, third receiving means) 22c receives, from the server 200, the instruction information 1b instructing execution of a predetermined process. The receiving section 22c transmits, to the process executing section 15a, the instruction information 1b thus received. In a case where the instruction information 1b is to be relayed to the domestic apparatus, the receiving section 22c outputs the instruction information 1b also to the transmitting section 21c.

Namely, the cleaning robot (controlled apparatus) 300a may further include (i) the receiving section (third receiving means) 22c for receiving information that the instruction information 1b instructing execution of the predetermined process is to be relayed and (ii) the transmitting section (second transmitting means) 21c for transmitting, in a case where the receiving section (third receiving means) 22c receives the information that the relaying is to be carried out, the instruction information 1b that is received by the receiving section (second receiving means) 22c and that instructs execution of the predetermined process to the external television image receiver (controlled apparatus) 300b indicated by this information.

According to the instruction information 1b received by the receiving section 22c, the process executing section (executing means) 15a executes the predetermined process (for example, a process of moving the cleaning robot 300a forward by 1 m or a process of rotating the cleaning robot 300a by 90° to the right; see (a) of FIG. 7). The process executing section 15a outputs, to the transmitting section 21c, a result of execution of the predetermined process (execution result 3a).

[Configuration of Television Image Receiver 300b]

With reference to (b) of FIG. 3, the following describes a configuration of the television image receiver 300b. (b) of FIG. 3 is a block diagram illustrating a main part of the configuration of the television image receiver 300b.

A receiving section (second receiving means) 22d receives, from the cleaning robot 300a, instruction information 1b instructing execution of a predetermined process, and outputs the instruction information 1b to a process executing section 15b.

According to the instruction information 1b received by the receiving section 22d, the process executing section (executing means) 15b executes the predetermined process (e.g., a process of turning on or off; see (b) of FIG. 7).

[Example where a Plurality of Images 5 are Contributed at Once]

With reference to FIG. 8, the following describes an example where the cleaning robot 300a or the domestic apparatus is caused to execute a series of processes in response to user's contributing a plurality of images 5 at once. FIG. 8 is a view schematically illustrating the family bulletin board on which the cleaning robot 300a contributes a result of execution of a series of processes specified by a plurality of images 5 contributed by a user at once.

As shown in FIG. 8, the user can contribute at once three images 5 respectively instructing the cleaning robot 300a to "move forward by 1 meter", to "rotate by 90° to the right", and to "take a photograph of the surroundings" on the family message board as a message 8g.

Namely, in response to user's touch on the image selecting button 44 (see FIG. 6), the smartphone 100 can display a plurality of images selectable by the user and transmit, to the server 200, a plurality of pieces of image information 2 respectively indicating a plurality of images 5 selected from the plurality of images. Thus, the smartphone 100 makes it possible to omit a user's troublesome procedure of contributing the images 5 one after another repeatedly in order to give an instruction to execute a series of processes.

Upon reception of the plurality of pieces of image information 2, the server 200 transmits, to an apparatus(es) specified by pieces of specifying information 1a respectively associated with the images 5 indicated by their corresponding plurality of pieces of image information 2, pieces of instruction information 1b each giving an instruction to execute a predetermined process.

In the example shown in FIG. 8, the server 200 transmits, to the "cleaning robot 300a" specified by the pieces of specifying information 1a, three pieces of instruction information 1b respectively instructing processes of "moving forward by 1 m", "rotating by 90° to the right", and "taking a photograph of the surroundings".

Upon reception of the three pieces of instruction information 1b, the cleaning robot 300a executes these three processes in order. It should be noted that the cleaning robot 300a contributes, on the family message board, only the result of execution of the process of "taking a photograph of the surroundings" as a message 8h, without transmitting the results of the execution of the processes of "moving forward by 1 m" and "rotating by 90° to the right" to the server 200.

Namely, in the case where the cleaning robot 300a receives a plurality of pieces of instruction information 1b as a result of user's contributing a plurality of images 5 at once on the family message board, the cleaning robot 300a contributes only a final result thereon and does not contribute an interim result thereon. Thus, the cleaning robot 300a makes it possible to omit a user's troublesome procedure of checking the interim result.

If an apparatus receives pieces of instruction information 1b contradicting each other, the apparatus does not need to execute predetermined processes specified by such the pieces of instruction information 1b. For example, in a case where the cleaning robot 300a receives two pieces of instruction information 1b instructing processes of "moving forward by 1 m" and "moving backward by 1 m", the cleaning robot 300a may be in a standby mode without executing the processes specified by the two pieces of instruction information 1b. For another example, in a case where the television image receiver 300b receives two pieces of instruction information 1b instructing processes of "turning on" and "turning off", the television image receiver 300b may be kept off without executing the processes specified by the two pieces of instruction information 1b.

In the example shown in FIG. 8, the user instructs only the cleaning robot 300a (i.e., the same apparatus) to execute the processes. Alternatively, instructions to execute the series of processes may be given to different apparatuses.

Further alternatively, one image 5 may be associated with a plurality of pieces of specifying information 1a and a plurality of pieces of instruction information 1b. In this case, in response to user's selection of such the one image 5, the cleaning robot 300a or the domestic apparatus may be caused to execute a series of processes. Thus, the smartphone 100 makes it possible to avoid causing again and again the user to carry out a troublesome procedure of selecting the image 5 in order to give an instruction to execute the series of processes.

[Example where Image is Contributed Via Television Image Receiver 300b]

In a case where the television image receiver 300b is included in the network, the user can contribute an image 5 via the television image receiver 300b.

Namely, in response to user's selection of an image 5 via an interface (e.g., a remote controller) capable of operating the television image receiver 300b, the television image receiver 300b (control apparatus) transmits, to the server 200, image information 2 indicative of the image 5, so as to cause an apparatus (e.g., the cleaning robot 300a or any of the domestic apparatuses such as the air conditioner 300c) specified by specifying information 1a associated with the image 5 to execute a predetermined process specified by instruction information 1b associated with the image 5.

Thus, the television image receiver 300b makes it possible to provide more convenience use, for example, by which a user can turn on the air conditioner 300c located on the first floor while the user is watching a television on the second floor.

[Process Executed in Family Message Board System 400]

With reference to FIG. 9, the following describes a flow of execution of a process in the family message board system 400. FIG. 9 is a flow chart of an example of a process executed in the family message board system 400 (the smartphone 100, the server 200, and the cleaning robot 300a). In the following description, the expression "a step of . . . " in parentheses indicates one of steps included in a method of controlling the smartphone 100.

The image display section 71a displays images 5 in such a manner as to be selectable by a user, each of the images 5 being associated with (i) specifying information 1a (herein, indicating the "cleaning robot 300a") and (ii) instruction information 1b (herein, indicating an instruction to "take a photograph of the surroundings") (step 1: hereinafter abbreviated as "S1", and corresponding to a step of displaying). In a case where the input section 40 (the input screen 41, the input control section 42) determines that one of the images 5 is selected by the user (YES in S2), the process instruction section 11 transmits, to the server 200, image information 2 indicative of the image 5 thus selected (S3, a step of instruction).

In a case where the receiving section 22b in the server 200 receives the image information 2 (S4), the transmitting section 21b transmits, to a plurality of smartphones 100, contribution information 4c of a message including the image information 2 (S24). Receiving sections 22a of the respective smartphones 100 receive the contribution information 4c (S25), and list display sections 71b of the respective smartphones 100 each display the message in such a manner as to be viewed in a list (S26).

The information extraction section 16 in the server 200 attempts to extract the specifying information 1a and the instruction information 1b associated with the image 5 indicated by the image information 2 (S5). In a case where the specifying information 1a and the instruction information 1b are extracted from the image 5 by the information extraction section 16 (YES in S27), the transmitting section 21b transmits a response request 4b to an apparatus (herein, the cleaning robot 300a) indicated by the specifying information 1a thus extracted (S6).

In a case where at least one of the specifying information 1a and the instruction information 1b is not extracted from the image 5 by the information extraction section 16 (NO in S27), the server 200 regards the image 5 as a general contributed message. Then, steps following S27 are skipped and the procedure ends.

In a case where the receiving section 22c in the cleaning robot 300a receives the response request 4b (S7), the transmitting section 21c transmits response information 4a and apparatus information 3b to the server 200 (S8).

In a case where the receiving section 22b in the server 200 receives the response information 4a and the apparatus information 3b (S9), the communication possibility judging section 14 determines that the cleaning robot 300a is in a communicable state (in the state (1)) (YES in S10), and the transmitting section 21b transmits the instruction information 1b to the cleaning robot 300a (S11). Further, the transmitting section 21b transmits the apparatus information 3b to the smartphones 100 (S12). The receiving sections 22a in the respective smartphones 100 receive the apparatus information 3b (S13).

In a case where the receiving section 22c in the cleaning robot 300a receives the instruction information 1b (S14), the process executing section 15a executes a predetermined process specified by the instruction information 1b (S15). Then, the transmitting section 21c transmits an execution result 3a to the server 200 (S16).

In a case where the receiving section 22b in the server 200 receives the execution result 3a (S17), the transmitting section 21b transmits the execution result 3a to the smartphones 100 (S18). The receiving sections 22a in the respective smartphones 100 receive the execution result 3a (S19). The smartphones 100 each display, in the vicinity of the message, a taken image obtained from the cleaning robot 300a via the server 200 (see (b) of FIG. 6).

With reference to FIG. 10, the following describes another flow of execution of a process in the family message board system 400. FIG. 10 is a flow chart of another example of a process executed in the family message board system 400 (the smartphone 100, the server 200, the cleaning robot 300a, and the television image receiver 300b). Note that some of steps in FIG. 10 which are the same as those described with reference to FIG. 9 are given the same reference numerals, and descriptions thereof are omitted (descriptions of S1 to S5, S11 to S14, S16 to S19, and S24 to S27 are omitted).

The transmitting section 21b in the server 200 transmits a response request 4b to an apparatus (herein, the television image receiver 300b) indicated by the specifying information 1a which is extracted (S6). However, as described above, the television image receiver 300b is not connected to the network. Therefore, the response request 4b is not received by the television image receiver 300b, and thus the response information 4a cannot be obtained from the television image receiver 300b.

Based on the fact that the response information 4a is not supplied from the television image receiver 300b even after a predetermined period of time has elapsed, the communication possibility judging section 14 determines that the television image receiver 300b is in the state (2) (NO in S10).

For example, in a case where the specifying information 1a specifies the "television image receiver 300b" and the instruction information 1b gives an instruction to "turn on", the information extraction section 16 changes the specifying information 1a and the instruction information 1b so that the specifying information 1a specifies the "cleaning robot 300a" and the instruction information 1b gives an instruction to "turn on the television image receiver 300b" (S20).

The transmitting section 21c in the cleaning robot 300a transmits the instruction information 1b thus changed to the television image receiver 300b (S21). In a case where the receiving section 22d in the television image receiver 300b receives the instruction information 1b (S22), the process executing section 15b executes a predetermined process specified by the instruction information 1b (S23).

In FIGS. 9 and 10, the server 200 is to receive the image information 2 in S4, and subsequently the server 200 is to transmit the response request 4b in S6. In FIG. 9, the server 200 is then to receive the response information 4a and the apparatus information 3b in S9. However, timings of the reception and the transmission are not limited to these. For example, regardless of whether or not the image information 2 is received, the server 200 may transmit the response request 4b at regular intervals, or the cleaning robot 300a may transmit the apparatus information 3b or information being similar to the response information 4a at regular intervals.

[Effects Given by Smartphone 100]

The smartphone 100 enables a user to control the cleaning robot 300a or the domestic apparatus, which is a control target, even if the user does not carry out an explicit operation of specifying the cleaning robot 300a or the domestic apparatus. With this, the smartphone 100 provides improved user's convenience.

SUMMARY

A control apparatus (the smartphone 100 or the television image receiver 300b) according to one embodiment of the present invention is (1) a control apparatus for controlling a controlled apparatus via a server, including: (2) first display means for displaying images in such a manner as to be selectable by a user, each of the images being associated with (i) a piece of specifying information for specifying a controlled apparatus and (ii) a piece of instruction information for instructing the controlled apparatus to execute a predetermined process; and (3) instruction means for transmitting, in a case where the user selects at least one of the images displayed by the first display means, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images.

A method for controlling a control apparatus according to one embodiment of the present invention is (1) a method for controlling a control apparatus that controls a controlled apparatus via a server, including: (2) a first displaying step of displaying images in such a manner as to be selectable by a user, each of the images being associated with (i) a piece of specifying information for specifying a controlled apparatus and (ii) a piece of instruction information for instructing the controlled apparatus to execute a predetermined process; and (3) an instruction step of transmitting, in a case where the user selects at least one of the images displayed in the first displaying step, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images.

According to the above-described conventional technique, information related to an external apparatus which is to be controlled (e.g., a television image receiver) is not included in image data, and therefore a user needs to specify the external apparatus. Namely, the user is forced to carry out an explicit operation of specifying an external apparatus which is to be controlled and transmitting an instruction to the external apparatus thus specified.

However, what is truly required by the user is a "function" that is provided by the external apparatus. In some cases, the apparatus that plays a main role in order to provide the "function" may be arbitrary one. Thus, the interface always forcing the user to carry out such the explicit operation is not user-friendly.

On the other hand, according to the above features (1) through (3), the control apparatus of the one embodiment of the present invention and the method for controlling that control apparatus transmits, to the server, the image information indicative of the image associated with (i) the specifying information for specifying the controlled apparatus and (ii) the instruction information for instructing the controlled apparatus to execute the predetermined process. Namely, the control apparatus or the like always transmits the image information to the server, and therefore does not require the user to carry out the explicit operation for "specifying the external apparatus".

In other words, the control apparatus or the like allows the user to control the controlled apparatus even if the user does not carry out the explicit operation of specifying the controlled apparatus, which is the control target. With this, the control apparatus or the like provides improved user's convenience.

Further, the control apparatus of the one embodiment of the present invention may be configured such that: (1) the instruction means transmits the piece of image information to the server providing a service which enables information to be shared by users having been registered in advance; and (2) said control apparatus further includes second display means for displaying, as information having been shared by the users, pieces of information in time series in such a manner as to be viewed at a glance, the pieces of information including at least the piece of image information transmitted by the instruction means.

According to the above features (1) and (2), the control apparatus of the one embodiment of the present invention transmits the image information to the server providing the service (e.g., a social network service) that enables information to be shared by users. Therefore, the control apparatus allows the image information to be shared by the plurality of users who uses the service.

Further, the control apparatus displays a message(s) contributed by a user(s), the image information transmitted in response to an instruction(s) given by a user(s), and/or the like in time series in such a manner as to be viewed at a glance. This allows all the users to know "who" has transmitted "what kind of instruction" to "whom". With this, the control apparatus provides further improved user's convenience.

Further, the control apparatus of the one embodiment of the present invention may further include: (1) obtaining means for obtaining, from the server, a result of execution of the predetermined process carried out by the controlled apparatus, (2) in a case where the obtaining means obtains the result of execution, the second display means further displaying the result of execution in the vicinity of the pieces of information displayed in such the manner as to be viewed at a glance.

According to the above features (1) and (2), the control apparatus of the one embodiment of the present invention allows the user to know that the result of execution is a response to the pieces of information displayed in such the manner as to be viewed at a glance. With this, the control apparatus provides further improved user's convenience.

Further, the control apparatus of the one embodiment of the present invention may be configured such that (1) in a case where a user selects a plurality of ones of the images, the instruction means transmits a plurality of pieces of image information indicative of the respective plurality of ones of the images to the server, so as to cause a controlled apparatus specified by a plurality of pieces of specifying information associated with the respective plurality of ones of the images to sequentially execute predetermined processes instructed by a plurality of pieces of instruction information associated with the respective plurality of ones of the images.

According to the above feature (1), the control apparatus of the one embodiment of the present invention instructs the controlled apparatus to execute a series of processes, thereby omitting a user's troublesome procedure of selecting images one after another repeatedly. With this, the control apparatus provides further improved user's convenience.

Further, the control apparatus of the one embodiment of the present invention may further include: (1) first judging means for judging whether or not the controlled apparatus is able to execute the predetermined process(es), (2) in a case where the first judging means determines that the controlled apparatus is not able to execute the predetermined process(es), the first display means not displaying the image(s) associated with the predetermined process(es).

According to the above feature (1), the control apparatus of the one embodiment of the present invention can limit a range of the images selectable by the user, according to the judgment on whether or not the controlled apparatus is capable of executing the predetermined process(es). Thus, the control apparatus can reduce user's burden of selection, thereby providing further improved user's convenience.

A server (server 200) of one embodiment of the present invention may be (1) a server communicably connected to the above control apparatus, including: (2) first receiving means for receiving, from the control apparatus, a piece of image information indicative of an image selected by a user; and (3) first transmitting means for transmitting, to a controlled apparatus specified by a piece of specifying information associated with the image indicated by the piece of image information received by the first receiving means, a piece of instruction information for instructing the controlled apparatus to execute a predetermined process.

According to the above features (1) through (3), the server of the one embodiment of the present invention relays the instruction information to the controlled apparatus specified by the specifying information. With this, the server can avoid control apparatus's requiring the user to carry out the above-described explicit operation. With this, the server provides improved user's convenience.

A controlled apparatus (the cleaning robot 300a, the television image receiver 300b, the air conditioner 300c, the illumination apparatus 300d, or the video recording apparatus 300e) of one embodiment of the present invention may be (1) a controlled apparatus controlled by the above control apparatus via the above server, including: (2) second receiving means for receiving a piece of instruction information for instructing the controlled apparatus to execute a predetermined process; and (3) executing means for executing the predetermined process according to the piece of instruction information received by the second receiving means.

According to the above features (1) through (3), the controlled apparatus of the one embodiment of the present invention can execute the predetermined process instructed by the piece of instruction information that is relayed by the server. With this, the controlled apparatus can execute the predetermined process instructed by the control apparatus, without causing the control apparatus to require the user to carry out the above-described explicit operation. With this, the controlled apparatus provides improved user's convenience.

A control system (family message board system 400) of one embodiment of the present invention may include (1) the above control apparatus, (2) the above server, and (3) the above controlled apparatus.

According to the above features (1) through (3), the control system of the one embodiment of the present invention provides the same effects as those attained by the control apparatus, the server, or the controlled apparatus.

Note that each of the control apparatus, the server, and the controlled apparatus may be realized by a computer. In this case, the present invention encompasses (i) a control program for causing the computer to operate as each means of the control apparatus, the server, and the controlled apparatus so as to realize the control apparatus, the server, or the controlled apparatus by the computer and (ii) a computer-readable recording medium in which the control program is stored.

[Combination of Features (Technical Means) in Embodiments]

It should be noted that the features included in the above-described embodiments can be combined as appropriate. Namely, the whole of or a part of all the features explained in the above-described embodiments may be combined not only in the explained embodiments but also in other embodiments, and embodiments thus obtained are also encompassed in the technical scope of the present invention. Further, it is possible to combine any of technical features described in the embodiments of the present invention in order to provide a new technical scheme.

[Examples of Realization by Software]

Finally, the blocks of the smartphone 100, the server 200, the cleaning robot 300a, and the television image receiver 300b may be realized by way of hardware as executed by a logical circuit provided on an integrated circuit (IC chip) or software as executed by a CPU (Central Processing Unit).

In the latter case, each of the smartphone 100, the server 200, the cleaning robot 300a, and the television image receiver 300b includes, e.g., a CPU for executing instructions in programs realizing the functions, a ROM (Read Only Memory) which contains the programs, a RAM (Random Access Memory) to which the programs are loaded, and a recording medium such as a memory containing the programs and various data. The object of the present invention can also be achieved by mounting, to the smartphone 100, the server 200, the cleaning robot 300a, or the television image receiver 300b, a computer-readable storage medium containing control program code (executable program, intermediate code program, or source program) for the smartphone 100, the server 200, the cleaning robot 300a, or the television image receiver 300b which is software realizing the aforementioned functions, in order for the computer (or CPU, MPU) to retrieve and execute the program code contained in the storage medium.

The storage medium may be a non-transitory tangible medium, for example, a tape such as a magnetic tape or a cassette tape; a disk such as a magnetic disk (e.g., a floppy (Registered Trademark) disk or a hard disk) or an optical disk (e.g., CD-ROM, MO, MD, DVD, or CD-R); a card such as an IC card (memory card) or an optical card; a semiconductor memory such as a mask ROM, EPROM, EEPROM (Registered Trademark), or a flash ROM; or a logical circuit such as PLD (Programmable Logic Device) or FPGA (Field Programmable Gate Array).

The smartphone 100, the server 200, the cleaning robot 300a, or the television image receiver 300b may be arranged to be connectable to a communications network so that the program code may be delivered over the communications network. The communications network only needs to be the one via which the program code can be delivered, and is not limited in any particular manner. The communications network may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network only needs to be the one by which the program code can be delivered, and is not limited to any particular arrangement or type. The transfer medium may be, for example, wired line such as IEEE 1394, USB, electric power line, cable TV line, telephone line, or ADSL line; or wireless such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network. The present invention encompasses computer data signals embedded in a carrier wave in which the program code is embodied electronically.

As such, "means" herein does not necessarily refer to physical means, but also refers to a case where a function of each means is realized by software. Further, a function of one means may be realized by two or more physical means, or functions of two or more means may be realized by one physical means.

INDUSTRIAL APPLICABILITY

The present invention is applicable to, e.g., apparatuses (such as a smartphone, a tablet terminal, a personal computer, and a television image receiver) capable of controlling a controlled apparatus via a server.

REFERENCE SIGNS LIST

1a Specifying information (specifying information)
1b Instruction information (instruction information)
2 Image information (image information)
3a Execution result (result of execution)
5 Image (image)
11 Process instruction section (instruction means)
12 Execution possibility judging section (first judging means)
13 Execution result obtaining section (obtaining means)
14 Communication possibility judging section (second judging means)
15a Process executing section (executing means)
15b Process executing section (executing means)
21b Transmitting section (first transmitting means)
21c Transmitting section (second transmitting means)
22b Receiving section (first receiving means)
22c Receiving section (second receiving means, third receiving means)
22d Receiving section (second receiving means)
71a Image display section (first display means)
71b List display section (second display means)
100 Smartphone (control apparatus)
200 Server (server)
300a Cleaning robot (controlled apparatus)
300b Television image receiver (control apparatus, controlled apparatus)
300c Air conditioning apparatus (controlled apparatus)
300d Illumination apparatus (controlled apparatus)
300e Video recording apparatus (controlled apparatus)
400 Family message board system (control system)

The invention claimed is:

1. A control apparatus for controlling a controlled apparatus via a server, comprising:

first display means for displaying images in such a manner as to be selectable by a user, each of the images being associated with (i) a piece of specifying information for specifying a controlled apparatus and (ii) a piece of instruction information for instructing the controlled apparatus to execute a predetermined process; and instruction means for transmitting, in a case where the user selects at least one of the images displayed by the first display means, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images, wherein:

the instruction means transmits the piece of image information to the server providing a social network service which enables information to be shared by users having been registered in advance; and said control apparatus further comprises:

second display means for displaying, as information having been shared by all the users who have been registered in advance, pieces of information including at least the piece of image information transmitted by the instructions means; and obtaining means for obtaining, from the server, a result of execution of the predetermined process carried out by the controlled apparatus, in a case where the obtaining means obtains the result of execution, the second display means further displaying, as information having been shared by all the user who have been registered in advance, the result of execution in the vicinity of the pieces of information displayed in such a manner as to be viewed at a glance, in a case where a user selects a plurality of ones of the images, the instruction means transmits a plurality of pieces of image information indicative of the respective plurality of ones of the images to the server, so as to cause a controlled apparatus specified by a plurality of pieces of specifying information associated with the respective plurality of ones of the images to sequentially execute predetermined processes instructed by a plurality of pieces of instruction information associated with the respective plurality of ones of the images.

2. The control apparatus as set forth in claim 1, further comprising:

first judging means for judging whether or not the controlled apparatus is able to execute the predetermined process, in a case where the first judging means determines that the controlled apparatus is not able to execute the predetermined process, the first display means not displaying an image which is associated with the predetermined process and is included in the images.

3. A server communicably connected to a control apparatus as set forth in claim 1, comprising:

first receiving means for receiving, from the control apparatus, a piece of image information indicative of an image selected by a user; and first transmitting means for transmitting, to a controlled apparatus specified by a piece of specifying information associated with the image indicated by the piece of image information received by the first receiving means, a piece of instruction information for instructing the controlled apparatus to execute a predetermined process.

4. A controlled apparatus controlled by a control apparatus as set forth in claim 1 via a server communicably connected to the control apparatus, the server including (i) first receiving means for receiving, from the control apparatus, a piece of image information indicative of an image selected by a user and (ii) first transmitting means for transmitting, to a controlled apparatus specified by a piece of specifying information associated with the image indicated by the piece of image information received by the first receiving means, a piece of instruction information for instructing the controlled apparatus to execute a predetermined process, said controlled apparatus comprising:

second receiving means for receiving the piece of instruction information for instructing the controlled apparatus to execute the predetermined process; and executing means for executing the predetermined process according to the piece of instruction information received by the second receiving means.

5. A control system, comprising:

a control apparatus as set forth in claim 1;

a server communicably connected to the control apparatus, the server including (i) first receiving means for receiving, from the control apparatus, a piece of image information indicative of an image selected by a user and (ii) first transmitting means for transmitting, to a controlled apparatus specified by a piece of specifying information associated with the image indicated by the piece of image information received by the first receiving means, a piece of instruction information for instructing the controlled apparatus to execute a predetermined process; and a controlled apparatus controlled by the control apparatus via the server, the controlled apparatus including (i) second receiving means for receiving the piece of instruction information for instructing the controlled apparatus to execute the predetermined process; and (ii) executing means for executing the predetermined process according to the piece of instruction information received by the second receiving means.

6. A method for controlling a control apparatus that controls a controlled apparatus via a server, comprising:

a first displaying step of displaying images in such a manner as to be selectable by a user, each of the images being associated with (i) a piece of specifying information for specifying a controlled apparatus and (ii) a piece of instruction information for instructing the controlled apparatus to execute a predetermined process; and an instruction step of transmitting, in a case where the user selects at least one of the images displayed in the first displaying step, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images, wherein in the instruction step, the piece of image information is transmitted to the server providing a social network service which enables information to be shared by users having been registered in advance; and said method further comprises:

a second displaying step of displaying, as information having been shared by all the users who have been registered in advance, pieces of information including at least the piece of image information transmitted by the instruction step; and an obtaining step of obtaining, from the server, a result of execution of the predetermined process carried out by the controlled apparatus, in a case where the result of execution is obtained in the obtained step, the result of execution is further displayed in the second displaying step, as information having been shared by all the users who have been registered in advance, in the vicinity of the pieces of information displayed in such a manner as to be viewed at a glance, in a case where a user selects a plurality of ones of the images, the instruction step transmits a plurality of pieces of image information indicative of the respective plurality of ones of the images to the server, so as to cause a controlled apparatus specified by a plurality of pieces of specifying information associated with the respective plurality of ones of the images to sequentially execute predetermined processes instructed by a plurality of pieces of instruction information associated with the respective plurality of ones of the images.

7. A non-transitory computer-readable storage medium storing therein a control program for causing a computer to function as a control apparatus for controlling a controlled apparatus via a server, said control program causing the computer to execute:

a first displaying step of displaying images in such a manner as to be selectable by a user, each of the images being associated with (i) a piece of specifying information for specifying a controlled apparatus and (ii) a piece of instruction information for instructing the controlled apparatus to execute a predetermined process; and an instruction step of transmitting, in a case where the user selects at least one of the images displayed in the first displaying step, a piece of image information indicative of said at least one of the images to the server, so as to cause a controlled apparatus that is specified by a piece of specifying information associated with said at least one of the images to execute a predetermined process that is instructed by a piece of instruction information associated with said at least one of the images, wherein in the instruction step, the piece of image information is transmitted to the server providing a social network service which enables information to be shared by users having been registered in advance; and said control program further causing the computer to execute:

a second displaying step of displaying, as information having been shared by all the users who have been registered in advance, pieces of information including at least the piece of image information transmitted by the instruction step; and an obtaining step of obtaining, from the server, a result of execution of the predetermined process carried out by the controlled apparatus, in a case where the result of execution is obtained in the obtained step, the result of execution is further displayed in the second displaying step, as information having been shared by all the users who have been registered in advance, in the vicinity of the pieces of information displayed in such a manner as to be viewed at a glance, in a case where a user selects a plurality of ones of the images, the instruction step transmits a plurality of pieces of image information indicative of the respective plurality of ones of the images to the server, so as to cause a controlled apparatus specified by a plurality of pieces of specifying information associated with the respective plurality of ones of the images to sequentially execute predetermined processes instructed by a plurality of pieces of instruction information associated with the respective plurality of ones of the images.

* * * * *